(12) United States Patent
Kumar et al.

(10) Patent No.: US 11,681,662 B2
(45) Date of Patent: Jun. 20, 2023

(54) TRACKING USERS MODIFYING A FILE

(71) Applicant: EMC IP Holding Company LLC, Hopkinton, MA (US)

(72) Inventors: Shiv S. Kumar, Pune (IN); Jai P. Gahlot, Pune (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 53 days.

(21) Appl. No.: 17/120,475

(22) Filed: Dec. 14, 2020

(65) Prior Publication Data

US 2022/0188272 A1    Jun. 16, 2022

(51) Int. Cl.
| | |
|---|---|
| *G06F 16/178* | (2019.01) |
| *G06F 16/16* | (2019.01) |
| *G06F 16/176* | (2019.01) |
| *G06F 16/17* | (2019.01) |

(52) U.S. Cl.
CPC .......... *G06F 16/178* (2019.01); *G06F 16/164* (2019.01); *G06F 16/176* (2019.01); *G06F 16/1734* (2019.01)

(58) Field of Classification Search
CPC .. G06F 16/178; G06F 16/164; G06F 16/1734; G06F 16/176
See application file for complete search history.

(56) References Cited

U.S. PATENT DOCUMENTS

| | | | |
|---|---|---|---|
| 7,636,736 B1* | 12/2009 | Kumar | G06F 16/1734 |
| | | | 707/999.102 |
| 9,367,579 B1* | 6/2016 | Kumar | G06F 16/1734 |
| 11,045,730 B1 | 6/2021 | Goldman | |
| 2006/0136356 A1* | 6/2006 | Hua | G06F 16/16 |
| 2012/0030242 A1* | 2/2012 | Nakamura | G06F 21/6218 |
| | | | 707/E17.032 |
| 2013/0013850 A1 | 1/2013 | Baderdinni | |
| 2018/0089224 A1 | 3/2018 | Muthuswamy et al. | |
| 2018/0314680 A1* | 11/2018 | Dorai | G06F 40/166 |
| 2021/0075733 A1 | 3/2021 | Szigeti et al. | |
| 2021/0240605 A1 | 8/2021 | Mills et al. | |
| 2022/0019372 A1 | 1/2022 | Vastrad et al. | |

OTHER PUBLICATIONS

Buchholz et al., On the Role of File System Metadata in Digital Forensics, Published in Journal of Digital Investigation, vol. 1(4), pp. 297-308, Dec. 2004 (Year: 2004).*

(Continued)

*Primary Examiner* — Tamara T Kyle
*Assistant Examiner* — Lana Alagic
(74) *Attorney, Agent, or Firm* — Amin, Turocy & Watson, LLP

(57) ABSTRACT

Techniques are provided for tracking users modifying, writing, or editing a file. In an example, a file system maintains a first-in-first-out queue that logs a finite set of users that have most-recently modified a file. This queue can be maintained in an extended attribute of an Mode that corresponds to a file. Where a user modifies a file, and the user is currently identified in the queue, the user can be removed from the queue. Where the user modifies a file, is not currently identified in the queue, and the queue is full, an oldest user in the queue can be removed from the queue. Then, the user can be added to the back of the queue.

20 Claims, 12 Drawing Sheets

(56) References Cited

OTHER PUBLICATIONS

Office Action dated Oct. 15, 2021 for U.S. Appl. No. 17/137,804, 66 pages.
Final Office Action received for U.S. Appl. No. 17/137,804 dated May 5, 2022, 80 pages.
Notice of Allowance received for U.S. Appl. No. 17/137,804 dated Jul. 27, 2022, 132 pages.

* cited by examiner

TRACKING USERS MODIFYING A FILE

TECHNICAL FIELD

The present application relates generally to storing files in computer storage systems.

BACKGROUND

Computer storage systems can provide data storage, modification and access to multiple users. This data can be represented as files in a computer file system. In some examples, multiple users can access and modify the same file.

BRIEF DESCRIPTION OF THE DRAWINGS

Numerous aspects, embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

A storage system can determine a latest number N of users who have edited a file. In some examples, the latest users who have edited a file can be used as follows. A command (that can be similar to "ls" on UNIX-type systems) can show the list of users who have modified a file, similar to how a file owner can be displayed. This information can be used for auditing. Data replication can be performed based on which user(s) have recently modified a file. An antivirus scan can be performed based on which user(s) have recently modified a file. Data tiering can be performed based on which users have recently modified a file.

In an example, tracking users for a file can involve doing the following when a new file is created, or an existing file is modified:
1. User user_id writes to a new or existing file f
2. Is file f AND user_id configured for tracking file edits?
2.1. If Yes,
    2.1.1. Is extended attribute "editors" available for file f?
        2.1.1.1. If No, add an extended attribute editors to file f
        2.1.1.2. Set editors attribute as a FIFO queue $Q(f)=\emptyset$
    2.1.2. If user_id is in Q
        2.1.2.1. Remove user_id from Q
    2.1.3. If number of elements in Q=N
        2.1.3.1. Remove oldest user_id from Q
    2.1.4. Append $Q(f)=Q(f) \cup user\_id$
2.2. If No,
    2.2.1. Is file extended attribute editors available?
        2.2.1.1. If Yes, update file extended attribute editors with NULL There can be a global setting in a system that indicates whether or not tracking user file modifications is to be performed. In some examples, this global setting can be an operating system or file system configuration parameter that can be changed in response to input at a command line interface of the system.

In some examples, a file blacklist and/or a user blacklist can be implemented that specify any files and users, respectively, to be omitted from tracking.

In some examples, when the global setting is On, the last N non-blacklisted users who have modified a particular file can be tracked for each non-blacklisted file. In some examples, when the global setting is Off, then there is no tracking of users who perform file modifications.

Example Architectures

Figure 1:
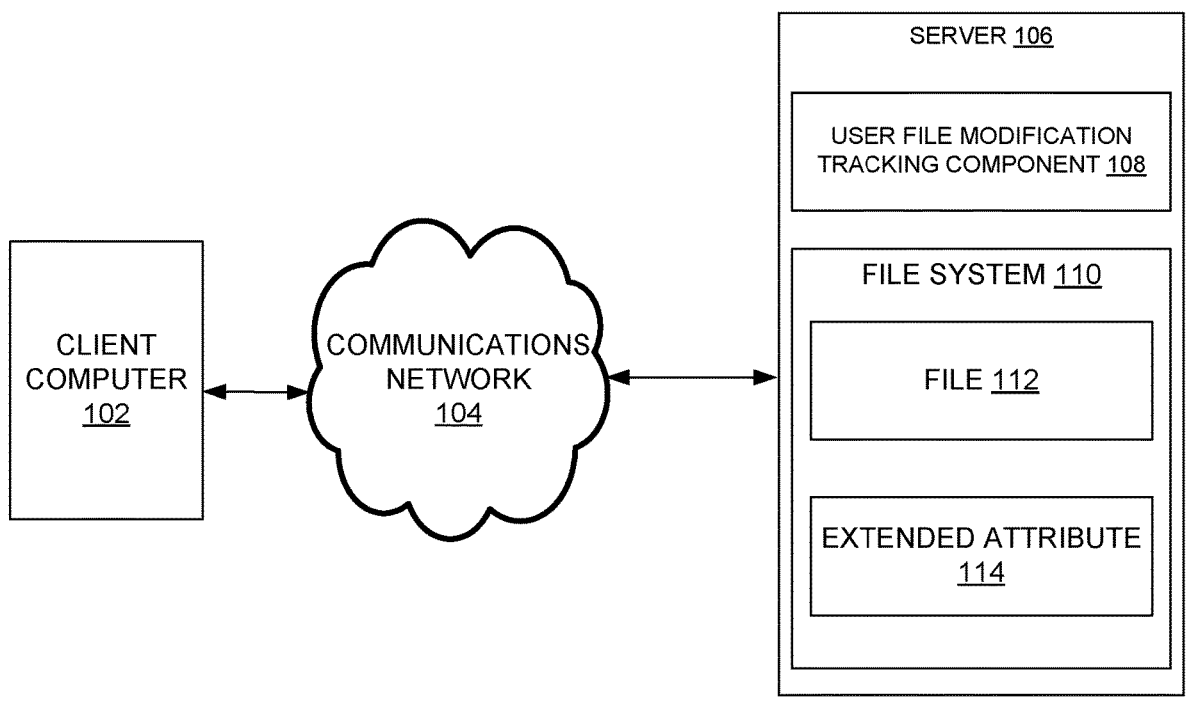
FIG. 1 illustrates an example system architecture that can facilitate tracking users modifying a file, in accordance with certain embodiments of this disclosure.

FIG. 1 illustrates an example system architecture 100 that can facilitate tracking users modifying a file, in accordance with certain embodiments of this disclosure. As used herein, the techniques can be applied to tracking users modifying, writing, or editing a file, and can generally be referred to as tracking users modifying a file. As depicted, system architecture 100 comprises client computer 102, communications network 104, and server 106. In turn, server 106 comprises user file modification tracking component 108, and file system 110 (which itself comprises file 112, and extended attribute 114).

Figure 12:
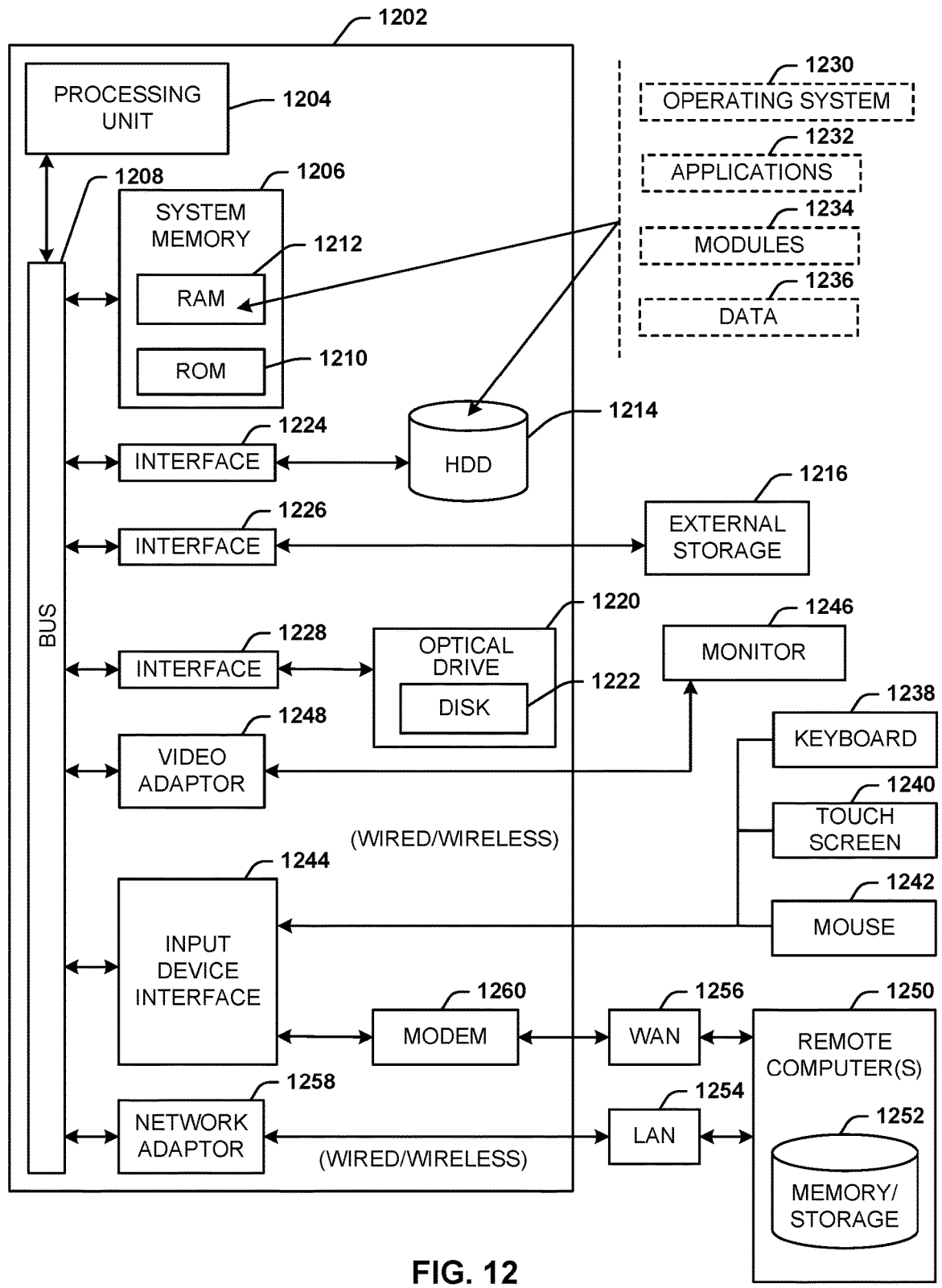
FIG. 12 illustrates an example block diagram of a computer operable to execute certain embodiments of this disclosure.

Each of client computer 102 and server 106 can be implemented with one or more instances of computer 1202 of FIG. 12. In some examples, server 106 comprises a distributed storage system that comprises multiple instances of computer 1202 of FIG. 12. In some examples, each of user file modification tracking component 108 and file system 110 can be implemented with machine-executable instructions and/or aspects of computer 1202 of FIG. 12.

Communications network 104 can comprise a computer communications network, such as the INTERNET, or an isolated private computer communications network.

Client computer 102 can access server 106 via communications network 104. In some examples, client computer 102 can access computer storage resources provided by server 106, such as to read, write, create, or delete one or more files (like file 112) stored in file system 110.

User file modification tracking component 108 can be used to track modification or creation of files in file system 110. In some examples, when a user of client computer 102 modifies a file of file system 110, user file modification tracking component 108 can log that the user modified this file. Using the example of file 112, user file modification tracking component 108 can maintain a list of users that have modified file 112 with extended attribute 114. Extended attribute 114 can be an extended attribute of file 112.

In some examples, user file modification tracking component 108 can maintain a first-in-first-out (FIFO) queue in extended attribute 114 of users who have modified file 112. A FIFO queue can generally comprise a two-dimensional, ordered data structure where elements are added to a first end of the data structure and removed from a second end of the data structure. In this manner, the first item that has been added to the data structure can eventually become the first item that is removed from the data structure. As applied to user file modifications, a FIFO queue can be used to track the N users who have most recently modified a file, where N is a maximum number of users that can be stored in the FIFO queue.

At a given point in time, those users identified in this FIFO queue in extended attribute 114 can be considered to be the set of users who have recently modified file 112.

Figure 2:
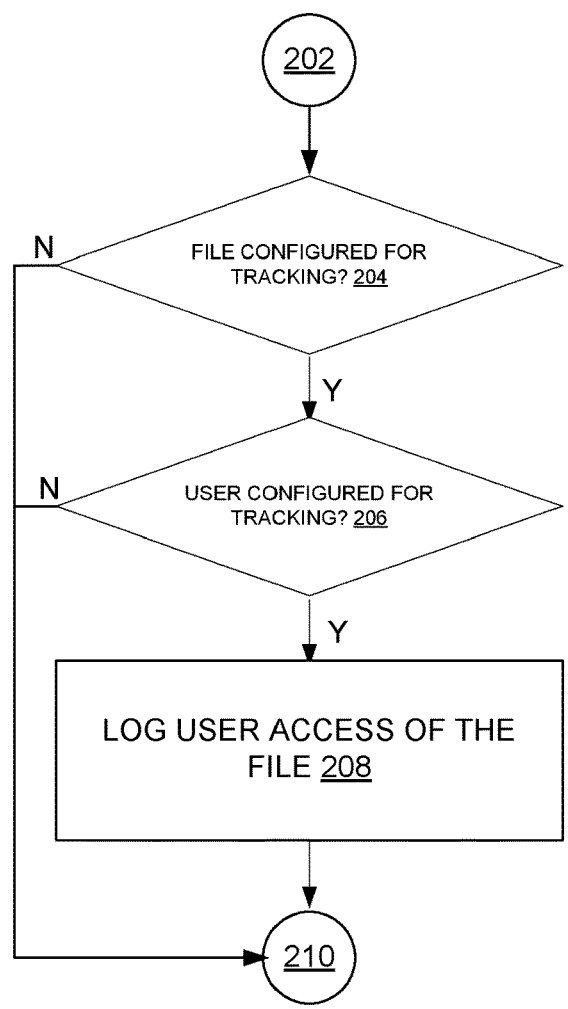
FIG. 2 illustrates an example process flow for determining whether a file modification is configured for user tracking to facilitate tracking users modifying a file, in accordance with certain embodiments of this disclosure.
Figure 3:
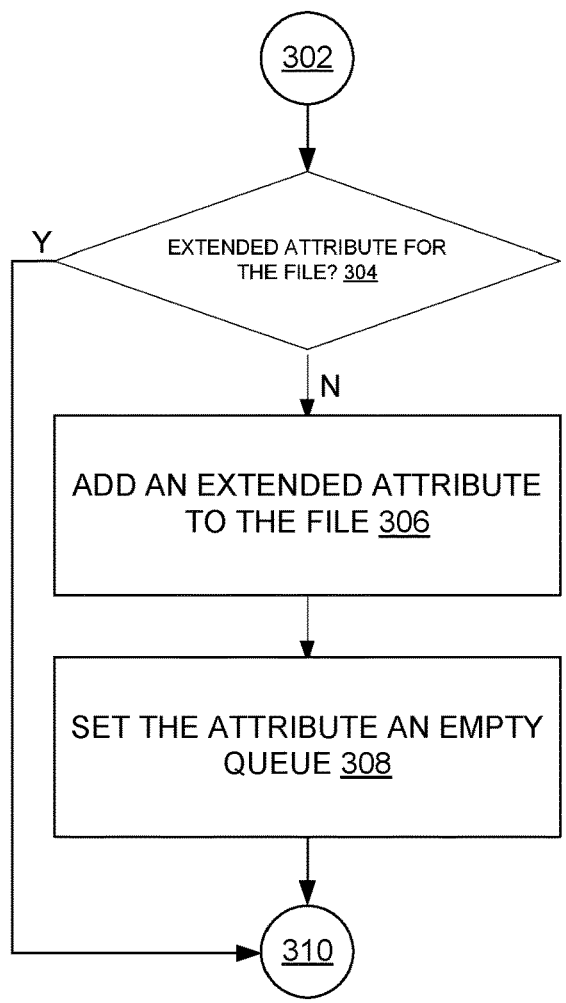
FIG. 3 illustrates an example process flow for creating an extended attribute for a file to facilitate tracking users modifying a file, in accordance with certain embodiments of this disclosure.
Figure 4:
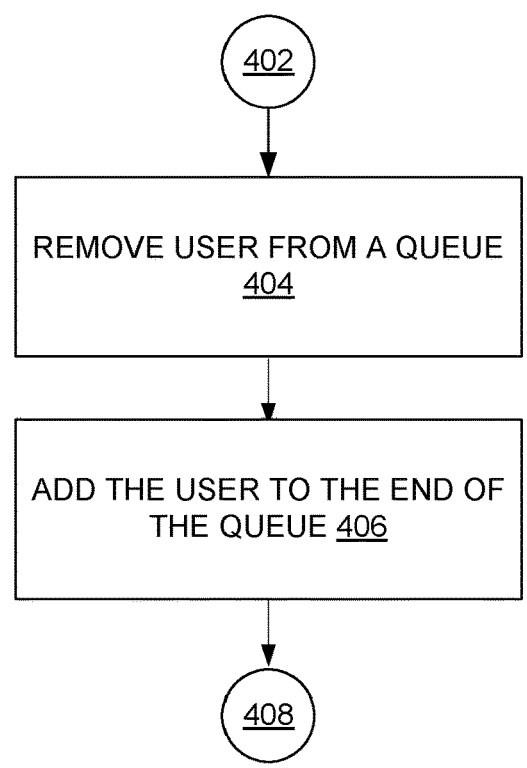
FIG. 4 illustrates an example process flow for updating a user queue where a user already exists in the queue to facilitate tracking users modifying a file, in accordance with certain embodiments of this disclosure.
Figure 5:
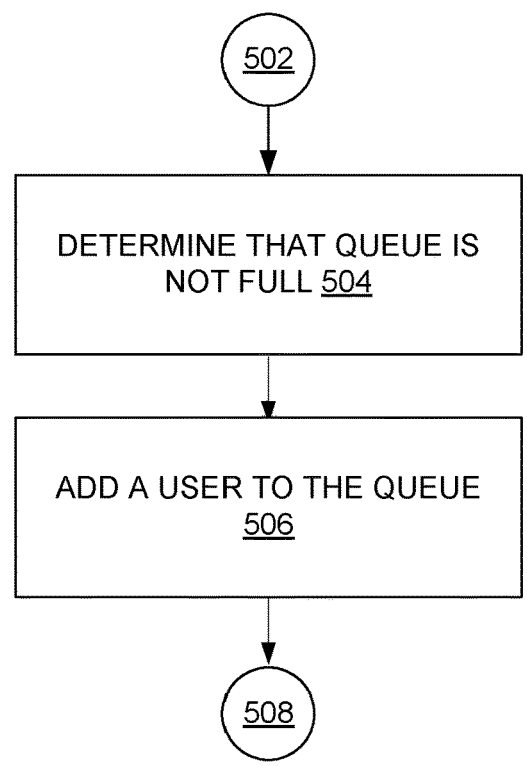
FIG. 5 illustrates an example process flow for updating a user queue where a user does not already exist in the queue, and the queue is not full, to facilitate tracking users modifying a file, in accordance with certain embodiments of this disclosure.
Figure 6:
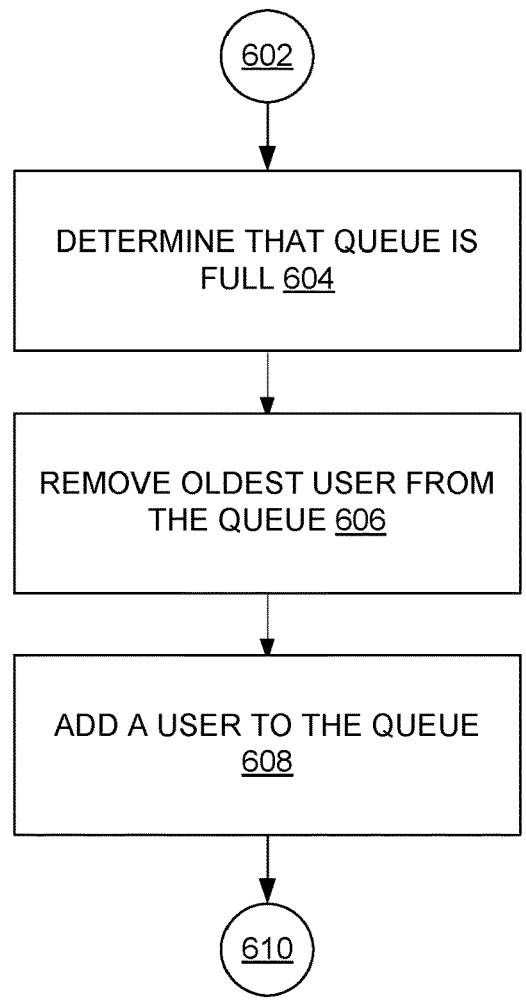
FIG. 6 illustrates an example process flow for updating a user queue where a user does not already exist in the queue, and the queue is full to facilitate tracking users modifying a file, in accordance with certain embodiments of this disclosure.
Figure 7:
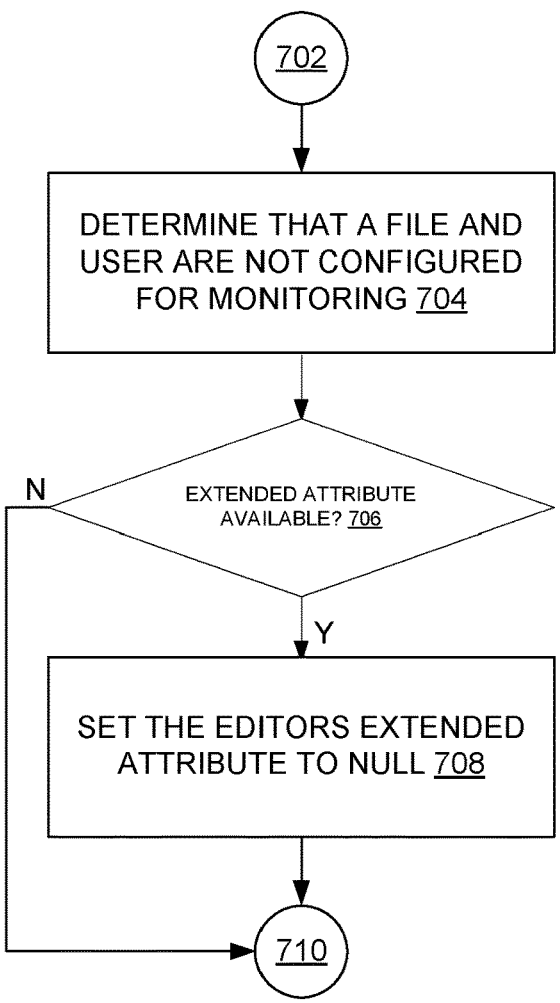
FIG. 7 illustrates an example process flow for processing a file that is not configured for user tracking, to facilitate tracking users modifying a file, in accordance with certain embodiments of this disclosure.
Figure 8:
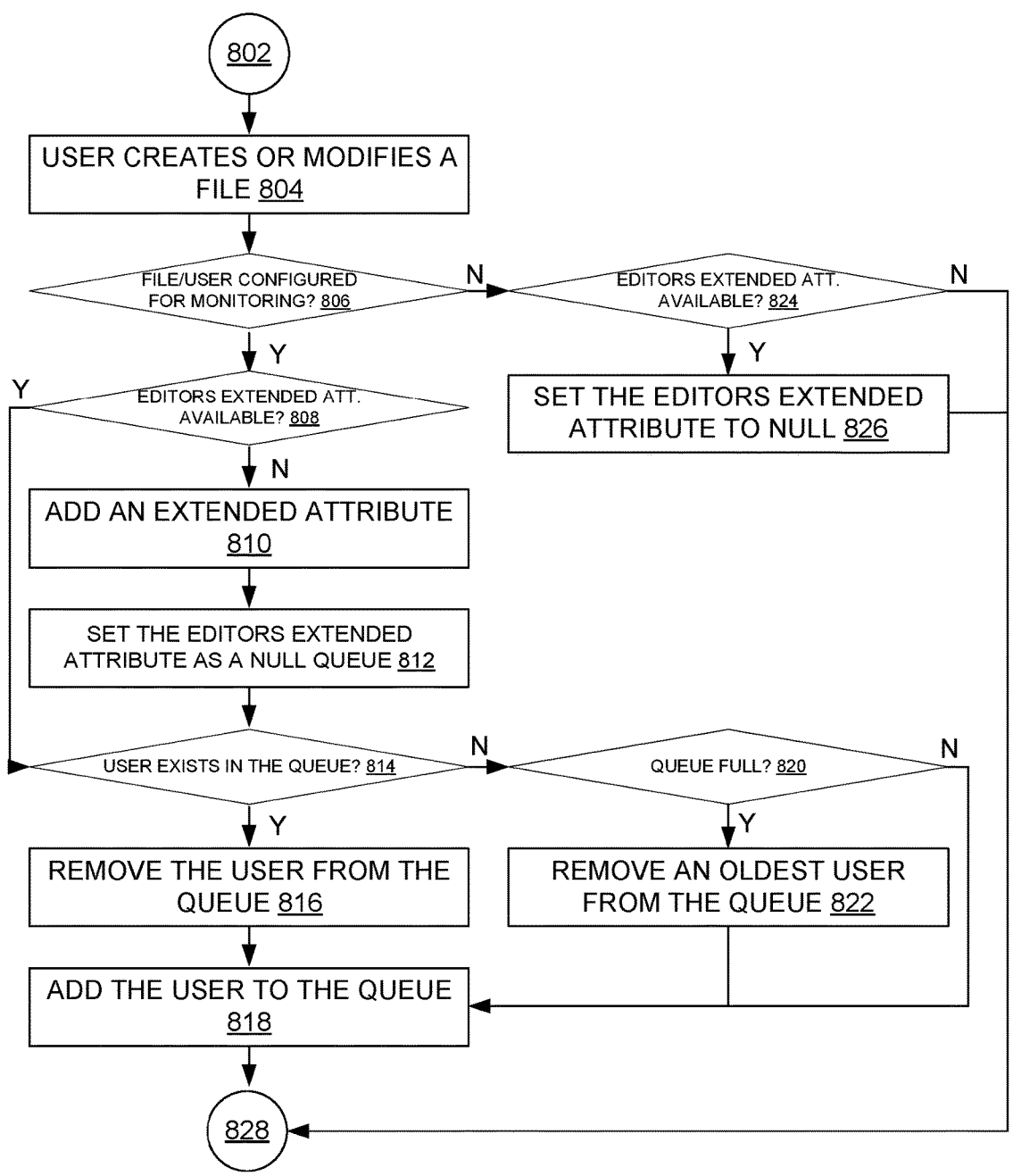
FIG. 8 illustrates an example process flow for tracking users modifying a file, in accordance with certain embodiments of this disclosure.
Figure 9:
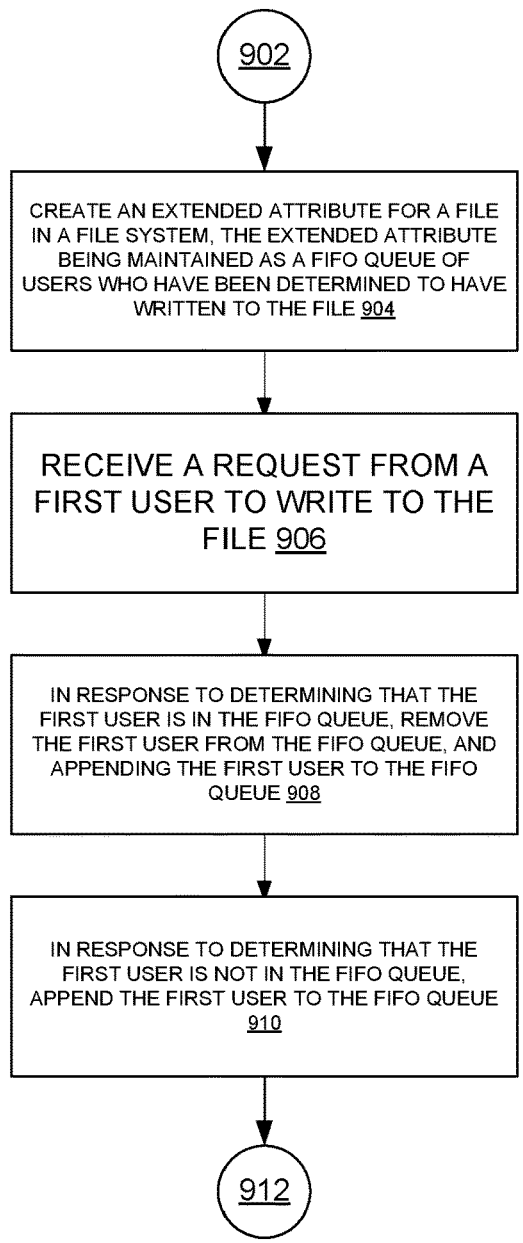
FIG. 9 illustrates another example process flow for tracking users modifying a file, in accordance with certain embodiments of this disclosure.
Figure 10:
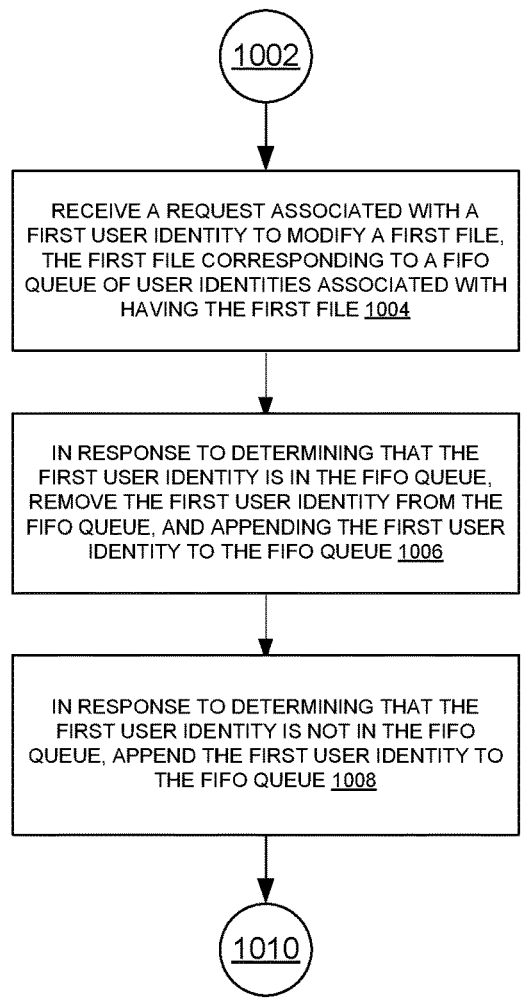
FIG. 10 illustrates another example process flow for tracking users modifying a file, in accordance with certain embodiments of this disclosure.
Figure 11:
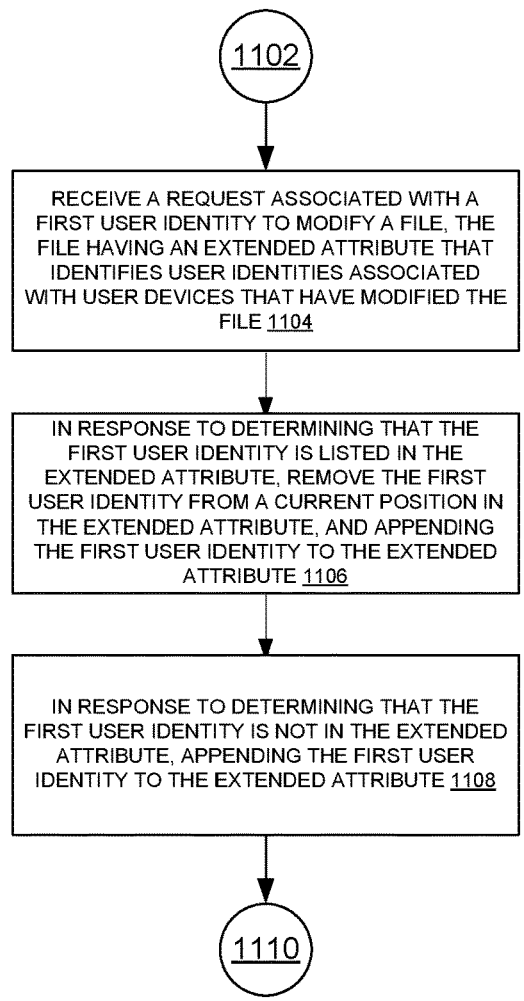
FIG. 11 illustrates another example process flow for tracking users modifying a file, in accordance with certain embodiments of this disclosure.

In implementing chaos testing in this manner, user file modification tracking component 108 can implement aspects of process flow 200 of FIG. 2, process flow 300 of FIG. 3, process flow 400 of FIG. 4, process flow 500 of FIG. 5, process flow 600 of FIG. 6, process flow 700 of FIG. 7, process flow 800 of FIG. 8, process flow 900 of FIG. 9, process flow 1000 of FIG. 10, and process flow 1100 of FIG. 11.

Example Process Flows

FIG. 2 illustrates an example process flow 200 for determining whether a file modification is configured for user tracking to facilitate tracking users modifying a file, in accordance with certain embodiments of this disclosure. In some examples, aspects of process flow 200 can be implemented by user file modification tracking component 108 of FIG. 1, or computing environment 1200 of FIG. 12.

It can be appreciated that the operating procedures of process flow 200 are example operating procedures, and that there can be embodiments that implement more or fewer operating procedures than are depicted, or that implement the depicted operating procedures in a different order than as depicted. In some examples, process flow 200 can be implemented in conjunction with aspects of one or more of process flow 300 of FIG. 3, process flow 400 of FIG. 4, process flow 500 of FIG. 5, process flow 600 of FIG. 6, process flow 700 of FIG. 7, process flow 800 of FIG. 8, process flow 900 of FIG. 9, process flow 1000 of FIG. 10, and process flow 1100 of FIG. 11.

Process flow 200 begins with 202, and moves to operation 204. Operation 204 depicts determining whether the file is configured for tracking. This can comprise determining whether a global setting for tracking is On, and if so, whether the particular file is found in a blacklist of files for which tracking of which users have recently modified the file is not to be performed. Where it is determined in operation 204 that the file is configured for tracking, process flow 200 moves to operation 206. Instead, where it is determined in operation 204 that the file is not configured for tracking, process flow 200 moves to 210, where process flow 200 ends.

Operation 206 is reached from operation 204 where it is determined that the file is configured for tracking. Operation 206 depicts determining whether the user is configured for tracking. Continuing with the example configuration of operation 204, this can comprise whether the user is found in a blacklist of users for which tracking of which users have recently modified the file is not to be performed.

Where it is determined in operation 206 that the user is configured for tracking, process flow 200 moves to operation 208. Instead, where it is determined in operation 208 that the user is not configured for tracking, process flow 200 moves to 210, where process flow 200 ends.

Operation 208 is reached from operation 206 where it is determined that the user is configured for tracking. Operation 208 depicts logging user access of the file. In some examples, this can comprise adding the user to the end of a queue for the file, and that is stored in an extended attribute of the file. For example, where the file being modified is file 112 of FIG. 1, the user can be added to the end of a queue that is stored is extended attribute 114. After operation 208, process flow 200 moves to 210, where process flow 200 ends.

FIG. 3 illustrates an example process flow 300 for creating an extended attribute for a file to facilitate tracking users modifying a file, in accordance with certain embodiments of this disclosure. In some examples, aspects of process flow 300 can be implemented by user file modification tracking component 108 of FIG. 1, or computing environment 1200 of FIG. 12.

It can be appreciated that the operating procedures of process flow 300 are example operating procedures, and that there can be embodiments that implement more or fewer operating procedures than are depicted, or that implement the depicted operating procedures in a different order than as depicted. In some examples, process flow 300 can be implemented in conjunction with aspects of one or more of process flow 200 of FIG. 2, process flow 400 of FIG. 4, process flow 500 of FIG. 5, process flow 600 of FIG. 6, process flow 700 of FIG. 7, process flow 800 of FIG. 8, process flow 900 of FIG. 9, process flow 1000 of FIG. 10, and process flow 1100 of FIG. 11.

Process flow 300 begins with 302, and moves to operation 304. Operation 304 depicts determining whether an extended attribute is available for the file. In some examples, file system 110 can maintain data using Mode data structures, where an Mode can both reference data blocks that store file data and data blocks that store extended attributes (which can generally be metadata about files).

In examples that utilize Modes, operation 304 can comprise accessing an Mode that corresponds to the file and examining its extended attributes for an extended attribute that corresponds to tracking user modifications.

Where it is determined in operation 304 that an extended attribute is available for the file, process flow 300 moves to 310, where process flow 300 ends. Instead, where it is determined in operation 304 that an extended attribute is not available for the file, process flow 300 moves to operation 306.

Operation 306 is reached from operation 304 where it is determined that an extended attribute is not available for the file. Operation 306 depicts adding an extended attribute for tracking user modifications to the file. In some examples, operation 306 can comprise defining a name for the tracking in the extended attribute in the Mode of operation 304.

After operation 306, process flow 300 moves to operation 308. Operation 308 depicts setting the attribute an empty queue. In some examples, this can comprise associating the name from operation 306 with a queue data structure, where that queue currently either comprises no elements or is otherwise Null. After operation 308, process flow 300 moves to 310, where process flow 300 ends.

FIG. 4 illustrates an example process flow 400 for updating a user queue where a user already exists in the queue to facilitate tracking users modifying a file, in accordance with certain embodiments of this disclosure. In some examples, aspects of process flow 400 can be implemented by user file modification tracking component 108 of FIG. 1, or computing environment 1200 of FIG. 12.

It can be appreciated that the operating procedures of process flow 400 are example operating procedures, and that there can be embodiments that implement more or fewer operating procedures than are depicted, or that implement the depicted operating procedures in a different order than as depicted. In some examples, process flow 400 can be implemented in conjunction with aspects of one or more of process flow 200 of FIG. 2, process flow 300 of FIG. 3, process flow 500 of FIG. 5, process flow 600 of FIG. 6, process flow 700 of FIG. 7, process flow 800 of FIG. 8, process flow 900 of FIG. 9, process flow 1000 of FIG. 10, and process flow 1100 of FIG. 11.

Process flow 400 begins with 402, and moves to operation 404. Operation 404 depicts removing the user from a queue. In some examples, the queue can be a FIFO queue where an order of when users were added to the queue is tracked. Where the queue is maintained as a linked list of queue elements, the queue can be traversed, comparing each user in the queue to the present user.

Where the queue element that stores the present user is found, that queue element can be removed from the queue (thus removing the user from the queue), and the queue elements that formerly neighbored this queue element can have pointers to their next and previous elements, respectively, updated to point to each other.

A list where an element has a pointer to both the subsequent and previous elements can be considered to be a doubly-linked list. There can be examples that implement this queue with a singly-linked list. It can be appreciated that there can be yet other ways to implement a FIFO queue, such as with a fixed-length array data structure and pointers. After operation 404, process flow 400 moves to operation 406.

Operation 406 depicts adding the user to the end of the queue. Continuing with the example queue data structure of operation 404, operation 406 can comprise adding a new list element to the back of the queue. Operation 406 can also comprise updating both a pointer that identifies the last element of the queue to point to this new list element, and updating a pointer from the previously-last element to point to this new element as the next element in the queue. After operation 406, process flow 400 moves to 408 where process flow 400 ends.

FIG. 5 illustrates an example process flow 500 for updating a user queue where a user does not already exist in the queue, and the queue is not full, to facilitate tracking users modifying a file, in accordance with certain embodiments of this disclosure. In some examples, aspects of process flow 500 can be implemented by user file modification tracking component 108 of FIG. 1, or computing environment 1200 of FIG. 12.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with aspects of one or more of process flow 200 of FIG. 2, process flow 300 of FIG. 3, process flow 400 of FIG. 4, process flow 600 of FIG. 6, process flow 700 of FIG. 7, process flow 800 of FIG. 8, process flow 900 of FIG. 9, process flow 1000 of FIG. 10, and process flow 1100 of FIG. 11.

Process flow 500 begins with 502, and moves to operation 504. Operation 504 depicts determining that a queue is not full. In some examples, a queue can be associated with a first stored number that identifies a number of elements being stored in the queue, and a second stored number that identifies a maximum number of elements that may be stored in the queue. In such examples, determining that the queue is not full can comprise comparing the first number and the second number. Where the first number and the second number are unequal, it can be determined that the queue is not full. After operation 504, process flow 500 moves to operation 506.

Operation 506 depicts adding a user to the queue. In some examples, operation 506 can be implemented in a similar manner as operation 406 of FIG. 4. After operation 506, process flow 500 moves to 508 where process flow 500 ends.

FIG. 6 illustrates an example process flow 600 for updating a user queue where a user does not already exist in the queue, and the queue is full to facilitate tracking users modifying a file, in accordance with certain embodiments of this disclosure. In some examples, aspects of process flow 600 can be implemented by user file modification tracking component 108 of FIG. 1, or computing environment 1200 of FIG. 12.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with aspects of one or more of process flow 200 of FIG. 2, process flow 300 of FIG. 3, process flow 400 of FIG. 4, process flow 500 of FIG. 5, process flow 700 of FIG. 7, process flow 800 of FIG. 8, process flow 900 of FIG. 9, process flow 1000 of FIG. 10, and process flow 1100 of FIG. 11.

Process flow 600 begins with 602, and moves to operation 604. Operation 604 depicts determining that a queue is full. Using the example of operation 504 of FIG. 5, determining that the queue is full in operation 604 can comprise comparing a first stored number that identifies a number of elements being stored in the queue with a second stored number that identifies a maximum number of elements that may be stored in the queue. Where the first number and the second number are equal, it can be determined that the queue is full. After operation 604, process flow 600 moves to operation 606.

Operation 606 removing an oldest user from the queue. In some examples, an oldest user of a queue can be that user that was added to the present queue least recently. This can be distinguished from other senses of the term "oldest," such as the user account that was first created relative to other user accounts. In some examples, the oldest user is then that user stored at the "head" (or "front") of the queue (in contrast to a "tail"—or "back"—of the queue to which users are newly added).

Where the queue is maintained as an ordered list data structure, removing the oldest user can comprise removing the list element (that identifies the oldest user) from the front of the list, and updating the queue to identify that the next-oldest user is now at the front of the list, such as by updating a pointer of the queue to the front element of the queue. After operation 606, process flow 600 moves to operation 608.

Operation 608 depicts adding a user to the queue. In some examples, operation 608 can be implemented in a similar manner as operation 406 of FIG. 4. After operation 608, process flow 600 moves to 610 where process flow 600 ends.

FIG. 7 illustrates an example process flow 700 for processing a file that is not configured for tracking users modifying a file, to facilitate tracking users modifying a file, in accordance with certain embodiments of this disclosure. In some examples, aspects of process flow 700 can be implemented by user file modification tracking component 108 of FIG. 1, or computing environment 1200 of FIG. 12.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with aspects of one or more of process flow 200 of FIG. 2, process flow 300 of FIG. 3, process flow 400 of FIG. 4, process flow 500 of FIG. 5, process flow 600 of FIG. 6, process flow 800 of FIG. 8, process flow 900 of FIG. 9, process flow 1000 of FIG. 10, and process flow 1100 of FIG. 11.

Process flow 700 begins with 702, and moves to operation 704. Operation 704 depicts determining that a file and user are not configured for tracking user modifications. In some examples, operation 704 can be implemented in a similar manner as operations 204-206 of FIG. 2, where not both a file (operation 204) and a user (operation 206) are determined to be configured for tracking. After operation 704, process flow 700 moves to operation 706.

Operation 706 depicts determining whether an extended attribute is available. In some examples, operation 706 can be implemented in a similar manner as operation 304 of FIG. 3.

Where it is determined in operation 706 that an extended attribute is available, then process flow 700 moves to operation 708. Instead, where it is determined in operation 706 that an extended attribute is not available, then process flow 700 moves to 710, where process flow 700 ends.

Operation 708 is reached from operation 706 where it is determined that an extended attribute is available. Operation 708 depicts setting the extended attribute to Null. In some examples, operation 708 can be implemented in a similar manner as operation 308 of FIG. 3. After operation 708, process flow 700 moves to 710, where process flow 700 ends.

FIG. 8 illustrates an example process flow 800 for tracking users modifying a file, in accordance with certain embodiments of this disclosure. In some examples, aspects of process flow 800 can be implemented by user file modification tracking component 108 of FIG. 1, or computing environment 1200 of FIG. 12.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with aspects of one or more of process flow 200 of FIG. 2, process flow 300 of FIG. 3, process flow 400 of FIG. 4, process flow 500 of FIG. 5, process flow 600 of FIG. 6, process flow 700 of FIG. 7, process flow 900 of FIG. 9, process flow 1000 of FIG. 10, and process flow 1100 of FIG. 11.

Process flow 800 begins with 802, and moves to operation 804. Operation 804 depicts a user creating or modifying a file. In some examples, this can server 106 of FIG. 1 receiving a request from client computer to create or modify a file stored in file system 110. After operation 804, process flow 800 moves to operation 806.

Operation 806 depicts determining whether the file and user are configured for tracking user modifications. In some examples operation 806 can be implemented in a similar manner as operations 204, 206, and 210 of FIG. 2. Where it is determined in operation 806 that the file and user are configured for tracking user modifications, process flow 800 moves to operation 808. Instead, where it is determined in operation 806 that the file and user are not configured for tracking user modifications, process flow 800 moves to operation 822.

Operation 808 is reached from operation 806 where it is determined that the file and user are configured for tracking user modifications. Operation 808 depicts determining whether an extended attribute is available. In some examples, operation 808 can be implemented in a similar manner as operation 304 of FIG. 3. Where it is determined in operation 808 that an extended attribute is available, process flow 800 moves to operation 814. Instead, where it is determined in operation 808 that an extended attribute is not available, process flow 800 moves to operation 810.

Operation 810 is reached from operation 808 where it is determined that an extended attribute is not available. Operation 810 depicts adding an extended attribute. In some examples, operation 810 can be implemented in a similar manner as operation 306 of FIG. 3. After operation 810, process flow 800 moves to operation 812.

Operation 812 depicts setting the extended attribute as a Null queue. In some examples, operation 812 can be implemented in a similar manner as operation 308 of FIG. 3. After operation 812, process flow 800 moves to operation 814.

Operation 814 is reached from operation 812, or from operation 808 (where it is determined that an extended attribute is available). Operation 814 depicts determining whether the user exists in the queue. In some examples, operation 814 can comprise traversing each user stored in the queue to determine whether that stored user matches the user associated with the file creation or modification in operation 804. Where it is determined in operation 814 that the user exists in the queue, process flow 800 moves to operation 816. Instead, where it is determined in operation 814 that the user does not exist in the queue, process flow 800 moves to operation 820.

Operation 816 is reached from operation 814 where it is determined that the user exists in the queue. Operation 816 depicts removing the user from the queue. In some examples, operation 816 can be implemented in a similar manner as operation 404 of FIG. 4. After operation 816, process flow 800 moves to operation 818.

Operation 818 is reached from operation 816, from operation 820 (where it is determined that the queue is not full), or from operation 822. Operation 818 depicts adding the user to the queue. In some examples, operation 818 can be implemented in a similar manner as operation 406 of FIG. 4. After operation 818, process flow 800 moves to operation 820.

Operation 820 is reached from operation 814 where it is determined that the user is not in the queue. Operation 820 depicts determining whether the queue is full. In some examples, operation 820 can be implemented in a similar manner as operation 504 of FIG. 5 and operation 604 of FIG. 6. Where it is determined in operation 820 that the queue is full, process flow 800 moves to operation 822. Instead, where it is determined in operation 820 that the queue is not full, process flow 800 moves to operation 818.

Operation 822 is reached from operation 820 where it is determined that the queue is full. Operation 820 depicts removing an oldest user from the queue. In some examples, operation 822 can be implemented in a similar manner as operation 404 of FIG. 4. After operation 822, process flow 800 moves to operation 818.

Operation 824 is reached from operation 806 where it is determined that the file and user are not configured for tracking user modifications. Operation 824 depicts determining whether an extended attribute is available. In some examples, operation 824 can be implemented in a similar manner as operation 706 of FIG. 7. Where it is determined in operation 824 that an extended attribute is available, process flow 800 moves to operation 826. Instead, where it is determined in operation 824 that an extended attribute is available, process flow 800 moves to 828, where process flow 800 ends.

Operation 826 is reached from operation 824 where it is determined that an extended attribute is available. Operation 826 depicts setting the extended attribute to Null. In some examples, operation 826 can be implemented in a similar manner as operation 708 of FIG. 7. After operation 826, process flow 800 moves to 828, where process flow 800 ends.

FIG. 9 illustrates another example process flow 900 for tracking users modifying a file, in accordance with certain embodiments of this disclosure. In some examples, aspects of process flow 900 can be implemented by user file modification tracking component 108 of FIG. 1, or computing environment 1200 of FIG. 12.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with aspects of one or more of process flow 200 of FIG. 2, process flow 300 of FIG. 3, process flow 400 of FIG. 4, process flow 500 of FIG. 5, process flow 600 of FIG. 6, process flow 700 of FIG. 7, process flow 800 of FIG. 8, process flow 1000 of FIG. 10, and process flow 1110 of FIG. 11.

Process flow 900 begins with 902, and moves to operation 904. Operation 904 depicts creating an extended attribute for a file in a file system, the extended attribute being maintained as a FIFO queue of users who have been determined to have written to the file. The FIFO queue can be used to keep track of which users have recently accessed the file.

In some examples, operation 904 comprises performing the creating of the extended attribute in response to creating the file. That is, the extended attribute for the queue can be created along with creating the file itself.

In some examples, operation 904 comprises performing the creating of the extended attribute in response to modifying the file and in response to determining that the extended attribute does not yet exist for the file. That is, where a file is modified, and it does not yet have an extended attribute for the queue, the extended attribute for the queue can be created at this point.

Operation 906 depicts receiving a request from a first user to write to the file.

In some examples, operations 908 and 910, which follow, can comprise updating the FIFO queue and be performed in response to the receiving of the request. In some examples, performing the updating of the FIFO queue is performed in response to determining that the file is configured for user tracking. That is, the queue can be used because the file is configured for tracking. In some examples, performing the updating of the FIFO queue is performed in response to determining that the first user is configured for user tracking. That is, the queue can be used because the user is configured for tracking.

Operation 908 depicts, in response to determining that the first user is in the FIFO queue, removing the first user from the FIFO queue, and appending the first user to the FIFO queue.

Operation 910 depicts, in response to determining that the first user is not in the FIFO queue, appending the first user to the FIFO queue.

In some examples, operation 910 comprises, in response to determining that the FIFO queue is full, removing an oldest user from the FIFO queue, the oldest user being a user represented in the FIFO queue for a longest amount of time. That is, the oldest entry in the queue can be removed where a new user is added to the queue and the queue is full.

FIG. 10 illustrates another example process flow 1000 for tracking users modifying a file, in accordance with certain embodiments of this disclosure. In some examples, aspects of process flow 1000 can be implemented by user file modification tracking component 108 of FIG. 1, or computing environment 1200 of FIG. 12.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with aspects of one or more of process flow 200 of FIG. 2, process flow 300 of FIG. 3, process flow 400 of FIG. 4, process flow 500 of FIG. 5, process flow 600 of FIG. 6, process flow 700 of FIG. 7, process flow 800 of FIG. 8, process flow 900 of FIG. 9, and process flow 1100 of FIG. 11.

Process flow 1000 begins with 1002, and moves to operation 1004. Operation 1004 depicts receiving a request associated with a first user identity to modify a first file, the first file corresponding to a FIFO queue of user identities associated with having the first file. In some examples, operation 1004 can be implemented in a similar manner as operations 904 and 906 of FIG. 9.

In some examples, the request comprises identification information representative of the first user identity. That is, a command to create or modify a file can specify a user identity that is issuing the command, and the user identity can be determined from the command itself.

In some examples, the FIFO queue is maintained as an extended attribute of the first file. In some examples, operation 1004 comprises creating FIFO queue based creating or modifying the first file, and based on determining that the first file lacks a corresponding file queue.

In some examples, operation 1004 comprises, based on modifying a second file corresponding to a second user identity, and to determining that either the second file or the second user identity is not configured for tracking user identities associated with modifying the second file, setting an extended attribute of the second file to null. That is, in some examples, the file and the user identity are not both configuring for tracking, and the file's extended attribute is available, so it is updated to have a Null value.

After operation 1004, process flow 1000 moves to operation 1006.

In some examples, operations 1006 and 1008, which follow can comprise, in response the receiving of the request, updating, by the system, the FIFO queue.

Operation 1006 depicts, in response to determining that the first user identity is in the FIFO queue, removing the first user identity from the FIFO queue, and appending the first user identity to the FIFO queue. In some examples, operation 1006 can be implemented in a similar manner as operation 908 of FIG. 9. After operation 1006, process flow 1000 moves to operation 1008.

Operation 1008 depicts, in response to determining that the first user identity is not in the FIFO queue, appending the first user identity to the FIFO queue. In some examples, operation 1008 can be implemented in a similar manner as operation 910 of FIG. 9.

In some examples, operation 1008 comprises, in response to determining that the FIFO queue is full, removing an oldest user identity from the FIFO queue as part of performing the determining that the first user identity is not in the FIFO queue. That is, when the FIFO queue is full and the FIFO queue has a maximum size, a user identity that was first inserted into the FIFO queue can be removed as part of inserting a new user identity into the FIFO queue. After operation 1008, process flow 1000 moves to 1010, where process flow 1008 ends.

FIG. 11 illustrates another example process flow 1100 for tracking users modifying a file, in accordance with certain embodiments of this disclosure. In some examples, aspects of process flow 1100 can be implemented by user file modification tracking component 108 of FIG. 1, or computing environment 1200 of FIG. 12.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1000 can be implemented in conjunction with aspects of one or more of process flow 200 of FIG. 2, process flow 300 of FIG. 3, process flow 400 of FIG. 4, process flow 500 of FIG. 5, process flow 600 of FIG. 6, process flow 700 of FIG. 7, process flow 800 of FIG. 8, and process flow 900 of FIG. 9.

Process flow 1100 begins with 1102, and moves to operation 1104. Operation 1104 depicts receiving a request associated with a first user identity to modify a file, the file having an extended attribute that identifies user identities associated with user devices that have modified the file. In some examples, operation 1104 can be implemented in a similar manner as operations 904 and 906 of FIG. 9.

In some examples, the extended attribute is maintained as a FIFO queue, and adding a new user identity to the FIFO queue when the FIFO queue is full comprises removing an oldest-added user identity from the FIFO queue. After operation 1104, process flow 1100 moves to operation 1106.

In some examples, operations 1106 and 1008 can comprise, in response the receiving of the request, updating the extended attribute. In some examples, performing the updating of the extended attribute is performed in response to determining that the file is configured for user tracking. In some examples, performing the updating of the extended attribute is performed in response to determining that the first user identity is configured for user tracking.

Operation 1106 depicts, in response to determining that the first user identity is listed in the extended attribute, removing the first user identity from a current position in the extended attribute, and appending the first user identity to the extended attribute. In some examples, operation 1106 can be implemented in a similar manner as operation 908 of FIG. 9. After operation 1106, process flow 1100 moves to operation 1108.

Operation 1108 depicts, in response to determining that the first user identity is not in the extended attribute, appending the first user identity to the extended attribute. In some examples, operation 1108 can be implemented in a similar manner as operation 910 of FIG. 9. After operation 1108, process flow 1100 moves to 1110, where process flow 1008 ends.

Example Operating Environment

In order to provide additional context for various embodiments described herein, FIG. 12 and the following discussion are intended to provide a brief, general description of a suitable computing environment 1200 in which the various embodiments of the embodiment described herein can be implemented.

For example, aspects of computing environment 1200 can be used to implement aspects of client computer 102, server 106, user file modification tracking component 108, and/or file system 110 of FIG. 1. In some examples, computing environment 1200 can implement aspects of the process flows of FIGS. 2-11 to facilitate tracking users modifying a file.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
creating a first extended attribute for a first file in a file system, the first extended attribute being maintained as a first-in-first-out (FIFO) queue of users who have been determined to have written to the first file;
receiving a request from a first user to write to the first file;
in response to the receiving of the request, updating the FIFO queue, comprising:
in response to determining that the first user is in the FIFO queue, removing the first user from the FIFO queue, and appending the first user to the FIFO queue; and
in response to determining that the first user is not in the FIFO queue, appending the first user to the FIFO queue; and
based on creating or modifying a second file in response to a second user writing to the second file, based on determining that either the second file or the second user is not configured for tracking edits to the second file, and based on determining that a second extended attribute of the second file is available, updating the second extended attribute of the second file to null.

2. The system of claim 1, wherein the operations further comprise, prior to the appending of the first user to the FIFO queue:
  in response to determining that the FIFO queue is full, removing an oldest user from the FIFO queue, the oldest user being a user represented in the FIFO queue for a longest amount of time.

3. The system of claim 1, wherein the creating of the first extended attribute comprises:
  creating the first extended attribute in response to creating the first file.

4. The system of claim 1, wherein the creating of the first extended attribute comprises:
  creating the first extended attribute in response to modifying the first file and in response to determining that the first extended attribute does not yet exist for the first file.

5. The system of claim 1, wherein the updating of the FIFO queue comprises:
  updating the FIFO queue in response to determining that the first file is configured for user tracking.

6. The system of claim 1, wherein the updating of the FIFO queue comprises:
  updating the FIFO queue in response to determining that the first user is enabled for user tracking.

7. The system of claim 1, wherein the request comprises identification information representative of an identity of the first user.

8. A method, comprising:
  receiving, by a system comprising a processor, a request associated with a first user identity to modify a first file, the first file corresponding to a first-in-first-out (FIFO) queue of user identities associated with having the first file;
  in response to the receiving of the request, updating, by the system, the FIFO queue, comprising:
    in response to determining that the first user identity is in the FIFO queue, removing the first user identity from the FIFO queue, and appending the first user identity to the FIFO queue; and
    in response to determining that the first user identity is not in the FIFO queue, appending the first user identity to the FIFO queue; and
  based on creating or modifying, by the system, a second file in response to a second user identity being associated with writing to the second file, determining that either the second file or the second user identity is not configured for tracking of edits to the second file, and further based on determining that a file extended attribute of the second file is available, updating the file extended attribute of the second file to null.

9. The method of claim 8, wherein the FIFO queue is maintained as an extended attribute of the first file.

10. The method of claim 8, further comprising:
  creating, by the system, the FIFO queue based creating or modifying the first file, and based on determining that the first file lacks a corresponding file queue.

11. The method of claim 8, wherein the request comprises identification information representative of the first user identity.

12. The method of claim 8, further comprising:
  in response to determining that the FIFO queue is full, removing an oldest user identity from the FIFO queue as part of performing the determining that the first user identity is not in the FIFO queue.

13. A non-transitory computer-readable medium comprising instructions that, in response to execution, cause a system comprising a processor to perform operations, comprising:
  receiving a request associated with a first user identity to modify a first file, the first file having a first extended attribute that identifies user identities associated with user devices that have modified the first file;
  in response to the receiving of the request, updating the first extended attribute, comprising:
    in response to determining that the first user identity is listed in the first extended attribute, removing the first user identity from a current position in the first extended attribute, and appending the first user identity to the first extended attribute, and
    in response to determining that the first user identity is not in the first extended attribute, appending the first user identity to the first extended attribute; and
  based on creating or modifying a second file, determining that either the second file or a second user identity associated with creating or modifying the second file is not configured to track edits to the second file, and based further on determining that a second extended attribute of the second file is available, updating the second file to set the second extended attribute of the second file to null.

14. The non-transitory computer-readable medium of claim 13, wherein the first extended attribute is maintained as a first-in-first-out (FIFO) queue, and wherein adding a new user identity to the FIFO queue when the FIFO queue is full comprises removing an oldest-added user identity from the FIFO queue.

15. The non-transitory computer-readable medium of claim 13, wherein the updating of the first extended attribute comprises:
  updating the first extended attribute in response to determining that the first file is configured for user tracking.

16. The non-transitory computer-readable medium of claim 15, wherein the updating of the first extended attribute comprise:
  updating the first extended attribute in response to determining that the first user identity is configured for user tracking.

17. The non-transitory computer-readable medium of claim 13, wherein the appending the first user identity to the first extended attribute comprises:
  in response to determining that the first extended attribute is full, removing an oldest user identity from the first extended attribute, the oldest user identity being a user identity represented in the first extended attribute for a longest amount of time.

18. The non-transitory computer-readable medium of claim 13, wherein the operations further comprise:
  creating the first extended attribute in response to creating the first file, or in response to modifying the first file and in response to determining that the first extended attribute does not yet exist for the first file.

19. The system of claim 1, wherein the updating of the FIFO queue further comprises:
  updating the FIFO queue in response to determining that the first file is configured for user tracking, and in response to determining that the first user is configured for user tracking.

20. The method of claim 8, wherein the updating of the FIFO queue further comprises:
  updating the FIFO queue in response to determining that the first file is configured for user tracking, and in response to determining that the first user identity is configured for user tracking.

* * * * *